Figure 3:
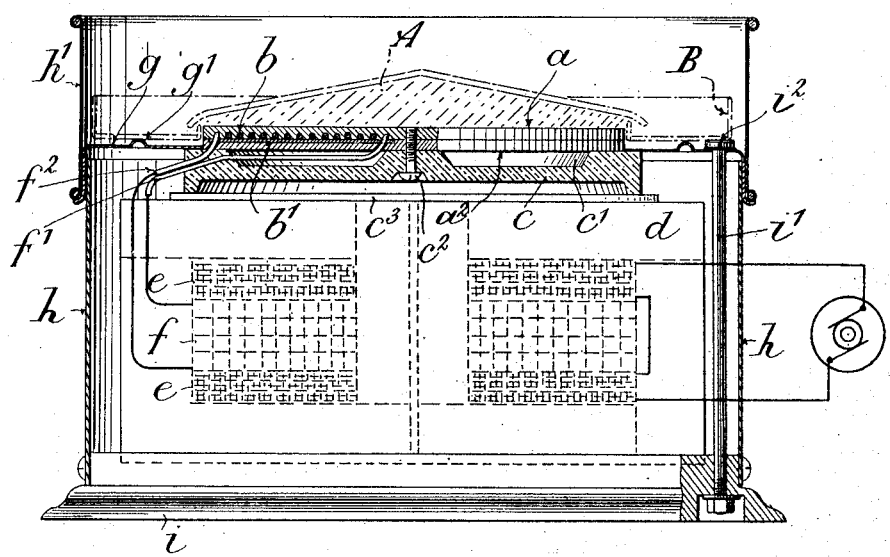

A. F. BERRY.
ELECTRICALLY HEATED APPARATUS SUITABLE FOR COOKING AND OTHER PURPOSES.
APPLICATION FILED NOV. 8, 1907.
959,913.
Patented May 31, 1910.
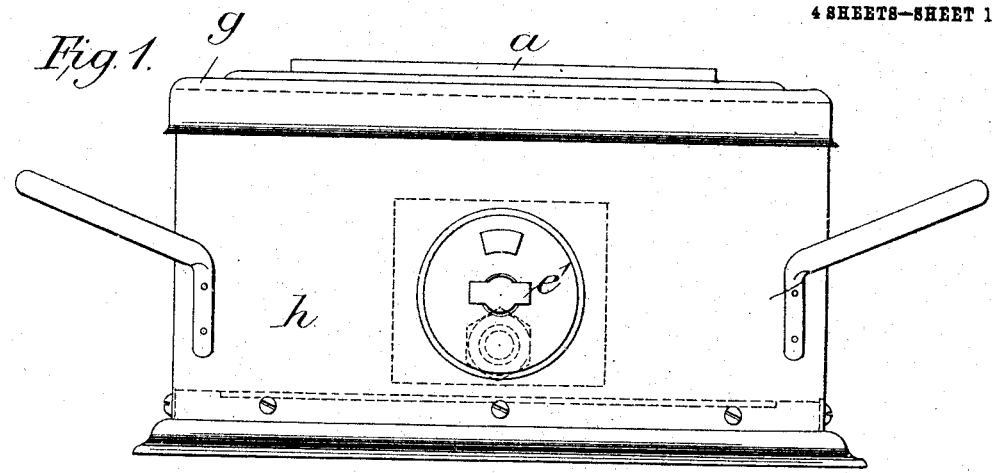
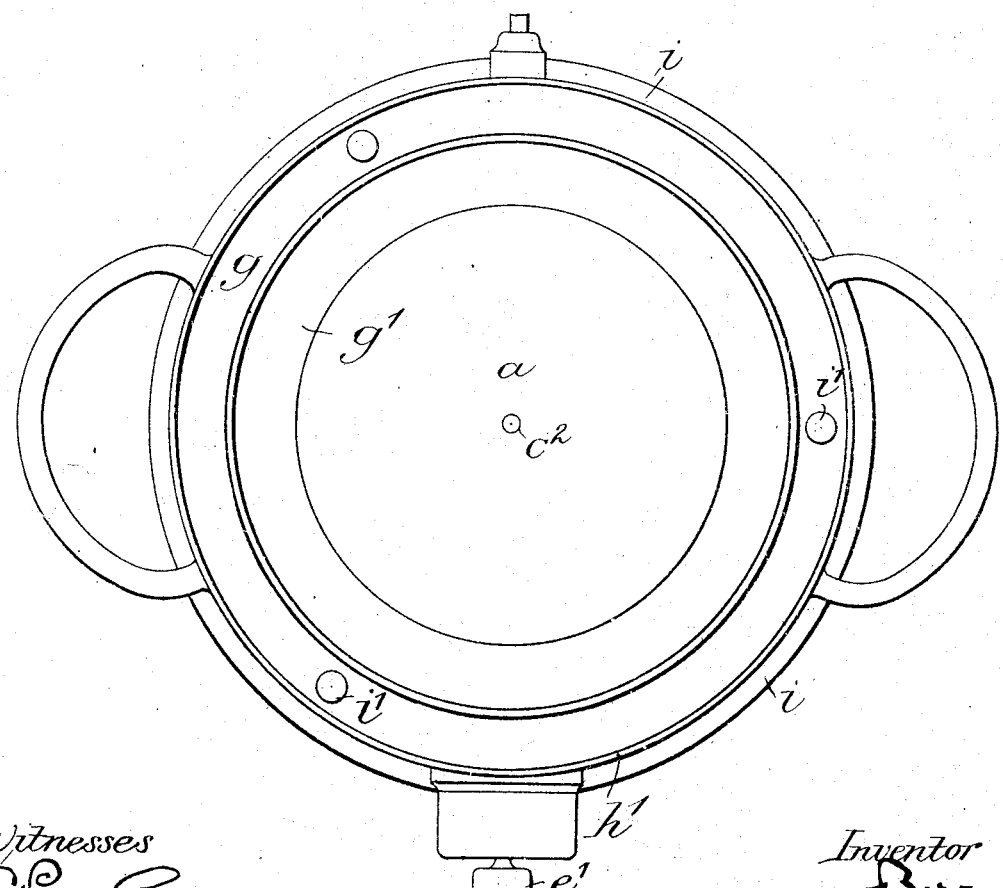

A. F. BERRY.
ELECTRICALLY HEATED APPARATUS SUITABLE FOR COOKING AND OTHER PURPOSES.
APPLICATION FILED NOV. 8, 1907.

959,913.

Patented May 31, 1910.

4 SHEETS—SHEET 3.

Witnesses

Inventor

A. F. BERRY.
ELECTRICALLY HEATED APPARATUS SUITABLE FOR COOKING AND OTHER PURPOSES.
APPLICATION FILED NOV. 8, 1907.
959,913.
Patented May 31, 1910.
4 SHEETS—SHEET 4.
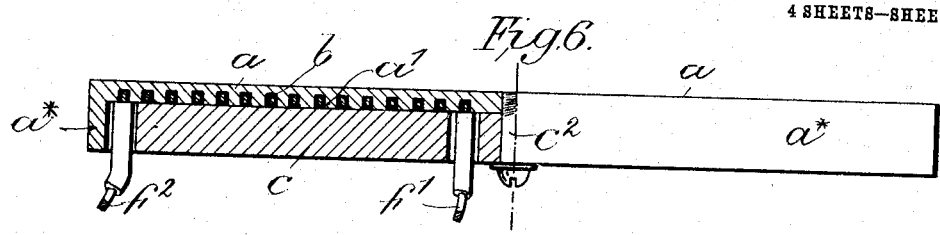
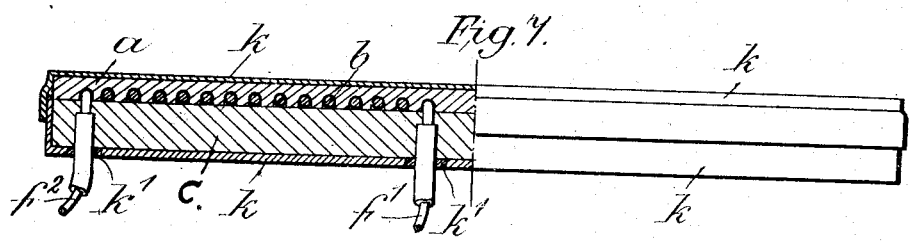
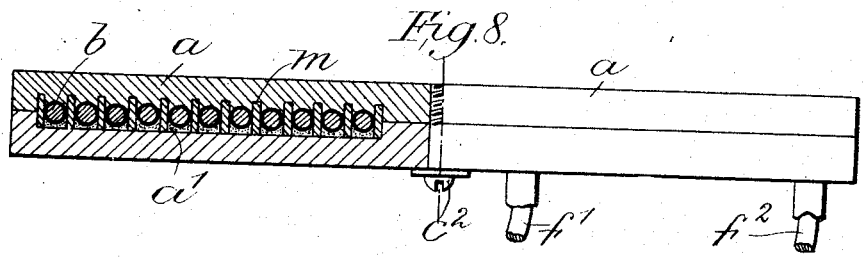
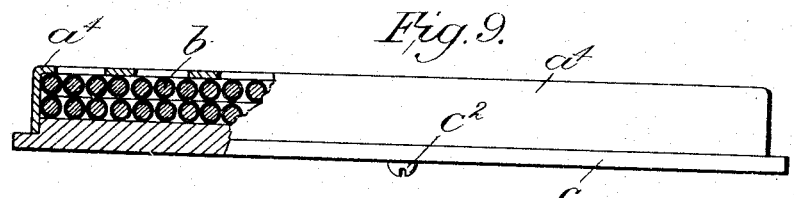
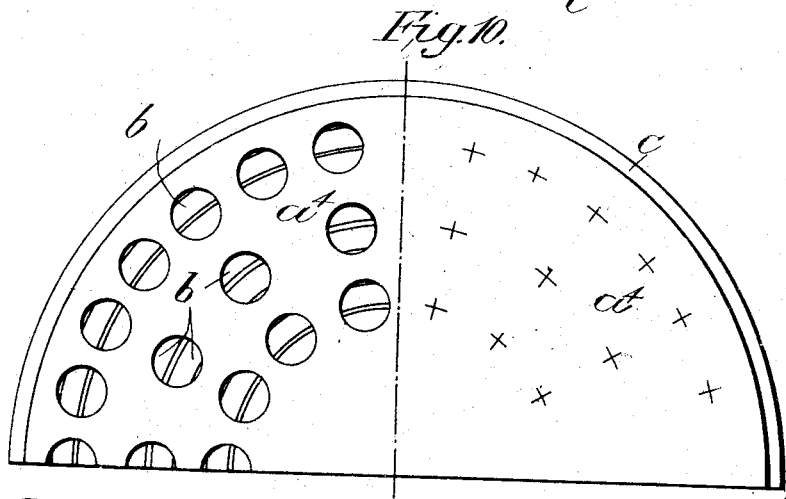
Witnesses
Inventor

UNITED STATES PATENT OFFICE.

ARTHUR FRANCIS BERRY, OF EALING, ENGLAND, ASSIGNOR TO GENERAL ELECTRIC COMPANY, A CORPORATION OF NEW YORK.

ELECTRICALLY-HEATED APPARATUS SUITABLE FOR COOKING AND OTHER PURPOSES.

959,913. Specification of Letters Patent. Patented May 31, 1910.

Application filed November 8, 1907. Serial No. 401,279.

*To all whom it may concern:*

Be it known that I, ARTHUR FRANCIS BERRY, a subject of the King of Great Britain and Ireland, residing at Ealing, in the county of Middlesex, England, have invented Improvements in Electrically-Heated Apparatus Suitable for Cooking and other Purposes, of which the following is a specification.

This invention relates to electrical heating apparatus of the induced current type, and particularly to that kind of apparatus in which heat is produced in a plate, support, oven wall or partition, heating screen or other like body (hereinafter referred to for brevity as a plate) by the action of alternating current flowing through the external current carrying portion of a secondary circuit the other or internal portion of which (hereinafter called for distinction the secondary element) is wound upon a magnetic core and has a secondary current induced in it by the action of a primary alternating current of higher voltage passing from a source of electric supply, such as ordinary supply mains, through a primary conductor wound upon the same core and hereinafter called for distinction the primary element.

In apparatus of this kind, where the plate forms part of the secondary circuit and this circuit forms a single turn of metal so that the current flowing therethrough is of very great strength and low voltage, a considerable amount of heat is liable to be transmitted by conduction from the plate to the secondary element and thence to the primary element through the connecting portions of the secondary circuit that are between the plate and secondary element and which are necessarily of large section. As a consequence of this, the resistance of the primary element is increased, and heat is also radiated from, and so lost, through the said connecting portions of the circuit, with the result that the efficiency of the apparatus is reduced, and the plate may also be less uniformly heated than is desirable.

Now an object of the present invention is to improve the efficiency of apparatus of the kind referred to and to increase the uniformity of heating over the whole surface of the plate by modifying the external current carrying portion of the secondary circuit so that it can be made of reduced cross sectional dimensions, thus minimizing its heat conducting and radiating powers and consequently the heat loss referred to.

Further objects of the invention are to improve the relative arrangement of the conductors forming the primary and secondary elements, so as to improve the power factor of the apparatus, and also to so generally improve the construction of the apparatus as to render the same very durable in use.

To this end, according to the present invention, a part of the current carrying portion of the secondary circuit (hereinafter called for distinction the inductive winding) that is connected in series with the secondary element of the apparatus, is composed of a conductor which may be wound, coiled or otherwise arranged in one or more layers in the closest possible proximity to but insulated from a plate, or a number of rings, of conducting metal arranged to constitute a tertiary circuit in which currents are induced by the alternating current traversing the inductive winding, which thus becomes a primary element thereto, the said conductor being disposed so that the whole of the said plate, or the rings, becomes or become uniformly heated, or practically so. The cross sectional dimension of the conductor is such as to lessen the tendency for heat to be conducted from the plate through the inductive winding to the connecting portions of the conductor and thence through the secondary element to the primary element on the magnetic core while the apparatus is in use, and at the same time to permit the employment of comparatively large secondary currents at low voltage, say for example of the order of between five and ten volts, and still larger currents in the plate. By casting the conducting metal constituting the plate of the desired shape and with the metal suitably distributed and so as to come into the closest possible proximity to the inductive winding, the said plate will be heated both by current induced in it by the inductive winding and also by heat conducted to it from the inductive winding which may be covered in so as to protect it from the cooling and oxidizing action of the external air and to stiffen it mechanically. The apparatus, which thus comprises primary and secondary elements on a magnetic core and a heating portion consisting of an inductive winding and plate, may be constructed in various forms.

Figure 4:
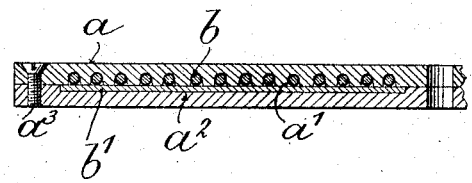
Figure 11:
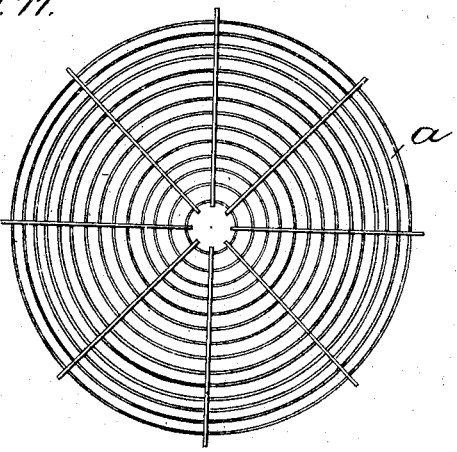
Figure 5:
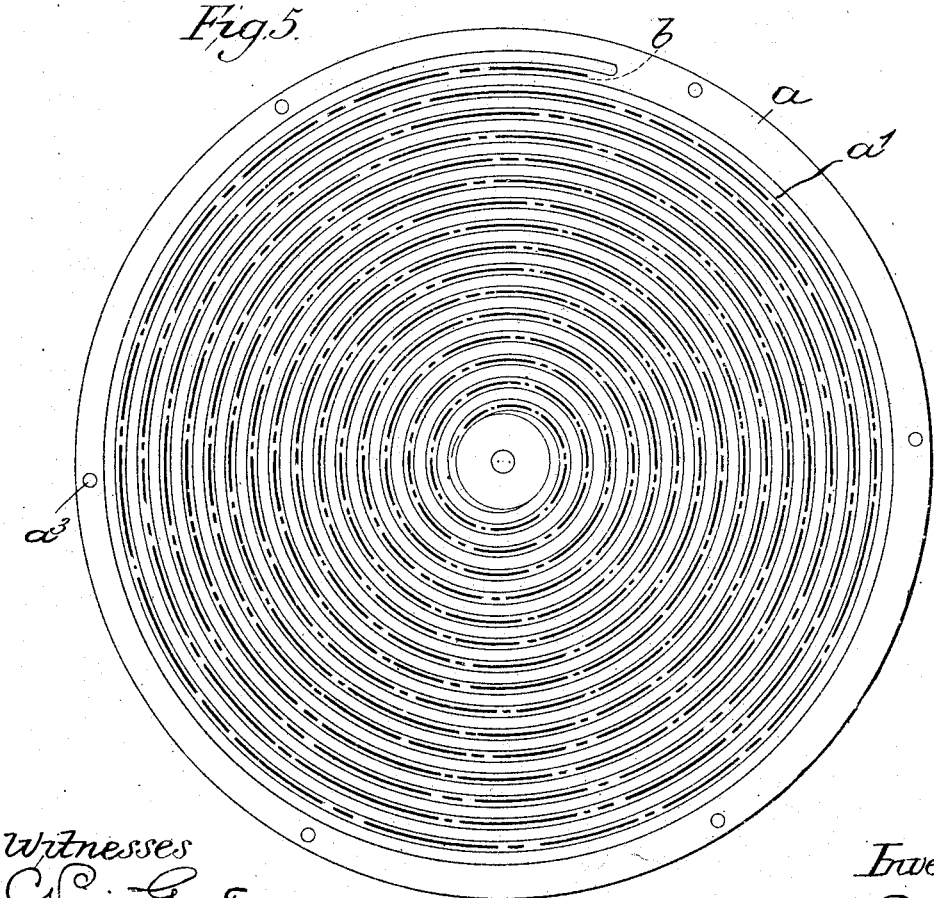

In the accompanying illustrative drawings, Figure 1 is a front elevation, Fig. 2 a plan, and Fig. 3 a central vertical section, showing one construction of electrical heating apparatus embodying the present invention, and suitable for heating kettles, saucepans and other vessels and also grilling devices, sad irons and other articles. Fig. 4 shows part of Fig. 3 to a larger scale. Fig. 5 is an underside view, also to a larger scale, of the inductive winding with the plate, with which it is combined. Figs. 6, 7 and 8 are part sectional elevations illustrating modified forms of the inductive winding and plate shown in Fig. 2. Figs. 9 and 10 show respectively in central vertical section and plan, another construction of plate with inductive winding. Fig. 11 shows in plan a further modified construction of plate.

In Figs. 1 to 5, the plate consists of a circular plate or disk $a$ of conducting metal, which may for instance be Muntz metal, but is preferably of magnetic metal, for example iron or steel, on the underside of which is located the inductive winding $b$. This element consists of a spirally wound inductive coil or conductor comprising several convolutions arranged in the same plane and formed of wire of ordinary circular section, as shown in Fig. 3, or of strip material arranged with the sides of the metal strip at right angles to the plane of the disk $a$, as shown in Fig. 6. The conductor forming the inductive winding $b$ may be wound or coiled spirally as shown in Fig. 5.

For the purpose of maintaining the conductor of the inductive winding $b$ in proper relative position to the plate, and for obtaining the maximum conversion of electrical energy therein into useful heat energy, the plate or disk $a$ may advantageously be formed on its underside, as shown in Figs. 3, 4 and 5, as by casting or turning, with a spiral groove $a^1$ corresponding more or less to the section of the conductor $b$ forming the inductive winding and into which groove the conductor can be wound and secured. A convenient manner of effecting this is to first insulate the conductor $b$ with a thin covering of suitable material capable of withstanding heat, for example with berrited asbestos, composed of a thin layer of asbestos paper saturated with the insulating material known in commerce as "berrite," and then wind the same into the said grooves in a lathe with the aid of a guide plate comprising a number of spring sectors. Or it may be insulated subsequently to its being wound in place, as for instance by enameling or coating it with a suitable composition. For the latter purpose, the groove $a^1$ in the plate $a$ in which the conductor is to be wound, may be coated with some appropriate vitreous enamel or the like, and, after such enamel has hardened, the bare conductor is placed in position therein and the remainder of the groove filled with the material constituting the enamel and the whole raised to the requisite temperature to cause the conductor to be embedded in and secured in position by the enamel. Or the conductor may be embedded in the material constituting the enamel while the same is in a powdered condition, and within the groove, the said material being afterward fused by heat to securely fix the conductor in place and insulate it from the plate $a$. In order to obtain the best effect, it is important that the inductive winding $b$ should be completely confined within the groove $a^1$, so that the ribs on the plates between adjacent parts of the groove shall project between the adjacent bent portions of the inductive windings.

A plate $a^2$ of metal for example iron, steel or the like, is then secured in an air tight manner, as by screws $a^3$, to the lower side of the plate $a$ so as to hold the inductive winding $b$ firmly in place and protect it from the cooling and oxidizing action of the external atmosphere. When the plate $a$ is to be used for heating flat bottomed vessels or other objects, care should be taken that the plate $a^2$ shall be heated to practically the same temperature as the plate $a$ so that the latter plate may remain flat on its upper surface. For this purpose, the two plates may be arranged in equally close proximity to the inductive winding $b$; or when the plate $a^2$ is arranged at a greater distance from the said element $b$ than the plate $a$, as in Figs. 3 and 4, there may be placed between the two iron plates, a sheet disk or ring $b^1$ of non-magnetic sheet metal such as brass, gun metal or the like, or of metallic filling or filings, that will be readily heated to a high temperature by currents set up therein by the action of the alternating current flowing through the inductive winding $b$, and by the magnetic flux passing through the iron plates and the center of the ring, and which will readily transmit its heat to the lower metal plate $a^2$. The two plates $a$ $a^2$ may be arranged in contact with each other both at the periphery and at the center, so as to form a closed magnetic circuit passing through the metal ring $b^1$. The inductive winding $b$ with plates $a$, $a^2$, $b^1$ thus constituted, may be supported by an asbestos or asbestos covered carrier $c$. In the example shown in Fig. 3, the carrier $c$ is shown as composed of a recessed block of insulating material above which is directly located the plate $a^2$, the space $c^1$ between the said carrier $c$ and plate $a^2$ being filled with material, for example mica dust that is a bad conductor of heat.

The block $c$ is secured to the plate $a$ $a^2$ by a screw $c^2$ and the whole may be firmly held upon the iron core $d$ carrying the primary and secondary elements $e$ and $f$ by a stamped flanged metal ring $g$ that is adapted to fit firmly over the outer portion of the block $c$ and tightly over the top of a casing $h$ inclosing the said core with primary and secondary windings, the whole being secured tightly together and to a wooden or other base $i$, by bolts $i^1$. A ring $c^3$ of asbestos or like badly conducting material may be placed between the block $c$ and core $d$, and the heads of the bolts $i^1$ are insulated from the ring $g$ by washers $i^2$ of insulating material. The plate $a$ extends a short distance above the ring $g$ which, when stamped to the shape shown, to impart strength thereto, has the annular recess $g^1$ therein filled with insulating material, for example the material known commercially as uacolite, to form a smooth flat surface. The portions $f^1$, $f^2$ of the secondary conductor connecting the secondary element $f$ to the inductive winding $b$ are led through the recess in the block $c$, and are preferably insulated as shown. $e^1$ is a switch for controlling the circuit of the primary winding $e$. $h^1$ is a draft excluder of thin sheet metal arranged to closely fit the stamped ring or lid $g$.

The bottom of the vessel, or the article to be heated, is preferably made of a thick mass of non-magnetic metal, for example copper, through which free magnetic flux will pass when the iron plates $a$ $a^2$ are magnetically saturated and in which current, large in value, will be induced and thereby assist in heating such mass. In Fig. 3, a griller A, consisting of a mass of nickeled copper having an opposite inclined ribbed upper surface, is shown resting upon the plate $a$, and B is an annular pan into which fat or other liquid can drain from the griller.

In Fig. 6, the insulated inductive winding $b$ rests directly against the asbestos block or carrier $c$ and against the underside of the plate $a$, which is flanged at $a^*$ so as to embrace and confine the wound conductor and the block or carrier $c$ in place.

In Fig. 7 a plate $a$ is shown in which the conductor $b$ is wound as above and a carrier $c$ of asbestos, fire clay or the like then placed in position next to the conductor and the whole confined within a divided metal casing $k$ that may be polished or nickel plated at the top, and the separate parts of which are brazed or soldered together while under pressure so as to render the same air tight. The apertures $k^1$ through which are passed the leads $f^1$, $f^2$, may be left free to serve as blow holes until after the apparatus has been tested, when they may be sealed in any suitable manner, such as by enamel. In the same way, a duplicate plate $a^2$, as in Figs. 3 and 4, may be provided and secured in place in lieu of the carrier $c$ (Fig. 7.).

As an alternative to the modes above alluded to, for constituting the spiral groove $a^1$, a spirally wound partition of strip brass may be employed, incorporated in a mold so that the plate can be cast thereon. A plate thus produced is shown in section in Fig. 8 wherein $m$ are the portions of the brass trip forming the partitions, $a$ the plate cast thereon, and $b$ the wire or conductor forming the inductive winding. Or the wire $b$ forming the inductive winding may be threaded through brass or other metal tubing which may be placed in or against the plate, or coiled to form a hot plate, as will be readily understood without illustration.

The inductive winding $b$ may comprise more than one layer of spirally wound conductor, and in some cases, the plate instead of being formed as a solid plate may be perforated. Figs. 9 and 10 show a plate embodying both of these features, the inductive winding $b$ comprising two layers of spirally wound conductor, and $a^4$ being the perforated plate. Also, for some purposes, as for a heat radiating screen or plate, the plate may be formed of a series of metal rings, or rectangular or other shaped frames of different sizes spaced apart one inside the other and connected together by connecting bars, as shown for example in Fig. 11.

The plate instead of being of non-magnetic metal such as Muntz metal or brass, or of unlaminated magnetic metal such as iron or steel surrounding or partly surrounding the inductive winding as hereinbefore described, may be made partly of non-magnetic and partly of magnetic metal, as shown for example in Fig. 8, hereinbefore referred to, where the top portion of the plate $a$ is of iron and the lower portion, formed by the spiral partition $m$, of brass.

The primary and secondary elements $e$ and $f$ with magnetic core $d$ may be common to a number of inductive windings with plates, as in the case of cooking apparatus designed for use as a boiler, griller, oven and so forth, switches being provided for controlling the connection between the several inductive windings $b$ thereof and the main secondary element $f$.

The main secondary element $f$ in apparatus constructed as described may consist of several turns and is or may with advantage be placed between two portions of the primary element $e$, as shown in Fig. 3, or between two primary elements, so as to increase the power factor of the apparatus.

Electrically heated apparatus embodying the present invention can be constructed in various forms to suit different requirements.

The details of construction can be variously modified.

What I claim is:—

1. Electrical heating apparatus comprising primary and secondary elements on a magnetic core and a heating portion supported upon but insulated from said core and comprising an inductive element of bent form in circuit with said secondary element, a plate insulated from but subject to the uniform inductive effect heat radiation of the inductive element, and a metal protecting plate secured to said insulated plate and forming therewith an air tight chamber inclosing said inductive element, and a casing inclosing said core with primary and secondary elements and surrounding said heating portion.

2. Electrical heating apparatus comprising primary and secondary elements on a magnetic core, a heating portion supported upon but insulated from said core and comprising a metal plate grooved on its lower side, an insulated inductive winding arranged within said groove and constituting an inductive element arranged in circuit with said secondary element, and a casing inclosing said core with primary and secondary elements and surrounding said heating portion.

3. Electrical heating apparatus comprising primary and secondary elements on a magnetic core and a heating portion supported upon but insulated from said core and comprising a metal plate having a groove in one surface thereof, an insulated inductive winding completely confined in said groove and arranged in circuit with said secondary element, a protecting plate arranged to cover the said grooved surface of the plate and the winding therein and form with said plate an air tight chamber for protecting said winding from the action of the external air, and a casing inclosing said core with primary and secondary elements and surrounding said heating portion.

4. Electrical heating apparatus comprising primary and secondary elements on a magnetic core and a heating portion surmounting the said elements and comprising two parallel and adjacent plates of magnetic material clamped together and inclosing between them an air tight groove, an insulated inductive winding, confined in said groove and arranged in circuit with said secondary element, the metal of the inclosing holder extending between adjacent bent portions of said inductive winding, and a casing inclosing said core with primary and secondary elements and surrounding said heating portion.

5. Electrical heating apparatus comprising primary and secondary elements on a magnetic core and a heating portion surmounting the said elements and comprising a plate of magnetic material having a groove in one surface adapted to confine an inductive winding therein, an inductive winding in circuit with said secondary element and arranged completely within said groove with the metal of said plate extending between adjacent bent portions of said winding, and a plate adapted to constitute a closed magnetic circuit with the aforesaid grooved plate around said inductive winding and forming with said plate an air tight holder for said winding.

6. Electrical heating apparatus comprising primary and secondary elements on a magnetic core and a heating portion comprising two plates of magnetic material clamped together, an insulated inductive winding in circuit with the said secondary element and arranged between the said plates and an annulus of non-magnetic conducting metal arranged between said insulated inductive winding and one of said magnetic plates.

7. Electrical heating apparatus comprising primary and secondary elements on a magnetic core and a heating portion comprising a plate of magnetic material having a groove in one surface thereof adapted to completely confine an inductive winding therein, an inductive winding arranged in said groove and in circuit with the first named secondary element, a plate adapted to form a closed magnetic circuit with the aforesaid grooved plate and a plate of non-magnetic but electricity conducting material arranged between said magnetic plates.

8. Electrical heating apparatus comprising primary and secondary elements on a magnetic core and a heating portion comprising two juxtaposed plates of magnetic material one of which has a groove of bent shape on its inner surface and the other an adjacent recessed surface, an insulated inductive winding arranged in said groove, and in circuit with the said secondary element, a plate of non-magnetic conducting metal arranged in the recessed surface of the second plate, and means for clamping together and supporting the juxtaposed plates.

9. Electrical heating apparatus comprising primary and secondary elements on a magnetic core and a heating portion mounted on but insulated from said core and comprising two juxtaposed circular plates of magnetic material one of which has a spiral groove on its inner surface and the other an annular groove on the corresponding surface, an insulated inductive winding arranged in said spiral groove and in circuit with said secondary element, and an annular plate of non-magnetic metal in said annular groove and means for clamping together and supporting the juxtaposed plates.

10. Electrical heating apparatus comprising primary and secondary elements on a magnetic core and a heating portion comprising an inductive winding in circuit with the said secondary element, an annular plate of non-magnetic metal arranged adjacent to said inductive winding and a heating body comprising two plates of magnetic material inclosing said inductive winding and non-magnetic plate and extending magnetically through and around said winding and plate.

11. Electrical heating apparatus comprising primary and secondary elements on a magnetic core, a spirally wound inductive element in circuit with the aforesaid secondary element, a horizontal plate having a spiral groove on its under side within which the inductive element is confined, a second plate beneath the said horizontal plate having an annular groove in its upper surface, an annular plate of non-magnetic conducting material arranged in the last mentioned groove, an annularly grooved carrier of non-conducting material supporting the said plates and supported by the magnetic core, means for clamping the plates and carrier together and a casing adapted to inclose the several elements so as to form a single heating block.

12. Electrical heating apparatus comprising primary and secondary elements on a magnetic core, a heating portion comprising an inductive winding in circuit with said secondary element, a hot plate arranged in inductive relation to the inductive winding and composed of magnetic material inclosing said inductive winding, and a mass of metal arranged on said hot plate.

13. Electrical heating apparatus comprising primary and secondary elements in a magnetic core, a heating portion comprising an inductive element in circuit with the said secondary element, a separate insulated plate arranged in inductive relation to the inductive element and a griller consisting of a mass of metal arranged to rest upon said plate and having an inclined ribbed upper surface.

14. Electrical heating apparatus comprising primary and secondary elements on a magnetic core, a heating portion comprising an inductive element in circuit with the said secondary element and a separate insulated plate arranged in inductive relation to the inductive element and a griller consisting of a mass of metal arranged to rest upon said plate and having an oppositely inclined ribbed upper surface.

15. Electrical heating apparatus comprising primary and secondary elements on a magnetic core, a heating portion comprising an inductive element in circuit with the said secondary element and a separate insulated plate containing said inductive element, a carrier of non-conducting material arranged between said plate and magnetic core, a base for said magnetic core, a casing surrounding said magnetic core and secured to said base, a cover plate or lid surrounding said plate and resting upon said carrier and means for holding said cover or lid upon said carrier and casing.

16. Electrical heating apparatus comprising primary and secondary elements on a magnetic core, a heating portion comprising an inductive element in circuit with the said secondary element, an annular induction plate of non-magnetic metal and a separate insulated plate formed of magnetic material arranged to form a closed magnetic circuit extending through and around and inclosing said inductive element and induction plate, a carrier of non-conducting material arranged between said insulated plate and magnetic core, a base for said magnetic core, a casing surrounding said magnetic core and secured to said base, a cover plate or lid surrounding said insulated plate and resting upon said carrier and means for holding said cover plate or lid upon said carrier and casing.

17. Electrical heating apparatus comprising primary and secondary elements on a magnetic core, a heating portion comprising an inductive element in circuit with the said secondary element, an annular induction plate of non-magnetic metal and a separate insulated plate formed of magnetic material arranged to form a closed magnetic circuit extending through and around and inclosing said inductive element and induction plate, a carrier of non-conducting material arranged between said insulated plate and magnetic core, a base for said core, a casing surrounding said core and secured to said base, a cover plate or lid surrounding said insulated plate and resting upon said carrier, means for securing said cover plate or lid upon said carrier and a draft excluder of sheet metal arranged to closely fit said cover plate or lid.

Signed at London England this 30th day of October 1907.

ARTHUR FRANCIS BERRY.

Witnesses:
C. VIVIAN GRIM,
H. D. JAMESON.